United States Patent
Cerwin

(10) Patent No.: US 7,528,762 B2
(45) Date of Patent: May 5, 2009

(54) SIGNAL PROCESSING METHODS FOR GROUND PENETRATING RADAR FROM ELEVATED PLATFORMS

(75) Inventor: Stephen A. Cerwin, Mico, TX (US)

(73) Assignee: Southwest Research Institute, San Antonio, TX (US)

( * ) Notice: Subject to any disclaimer, the term of this patent is extended or adjusted under 35 U.S.C. 154(b) by 108 days.

(21) Appl. No.: 11/278,056

(22) Filed: Mar. 30, 2006

(65) Prior Publication Data

US 2007/0024489 A1 Feb. 1, 2007

Related U.S. Application Data

(60) Provisional application No. 60/667,129, filed on Mar. 31, 2005.

(51) Int. Cl.
*G01S 13/90* (2006.01)
*G01V 3/12* (2006.01)
*G01V 3/16* (2006.01)
*G01V 3/17* (2006.01)

(52) U.S. Cl. .................. 342/22; 342/25 R; 342/159

(58) Field of Classification Search .......... 342/22, 342/25 C, 25 R, 159, 90, 179; 324/330, 332
See application file for complete search history.

(56) References Cited

U.S. PATENT DOCUMENTS

| | | | | | |
|---|---|---|---|---|---|
| 3,993,994 | A * | 11/1976 | Goggins | .................. | 342/25 B |
| 4,495,500 | A | 1/1985 | Vickers | ......................... | 343/5 |
| 5,017,922 | A * | 5/1991 | Klausing et al. | ........... | 342/25 F |
| 5,673,050 | A * | 9/1997 | Moussally et al. | ............ | 342/22 |
| 5,942,899 | A | 8/1999 | Shrekenhamer et al. | ..... | 324/326 |
| 6,094,157 | A * | 7/2000 | Cowdrick | .................... | 342/22 |
| 6,424,288 | B1 * | 7/2002 | Woodell | .................. | 342/26 R |
| 6,429,802 | B1 * | 8/2002 | Roberts | ....................... | 342/22 |
| 6,509,862 | B2 * | 1/2003 | Klausing et al. | .......... | 342/25 R |
| 6,515,613 | B2 * | 2/2003 | Klausing et al. | .......... | 342/25 R |
| 6,549,159 | B1 * | 4/2003 | Wolframm et al. | ........ | 342/25 R |
| 6,633,253 | B2 * | 10/2003 | Cataldo | .................... | 342/25 R |
| 6,753,529 | B2 | 6/2004 | DiMarzio et al. | ........ | 250/341.6 |
| 6,772,091 | B1 | 8/2004 | Roberts | ....................... | 702/166 |
| 7,002,508 | B2 * | 2/2006 | Wolframm et al. | ........ | 342/25 R |
| 7,095,358 | B2 * | 8/2006 | Krikorian et al. | ......... | 342/25 B |
| 7,142,300 | B2 * | 11/2006 | Rosengaus | .................. | 356/369 |

(Continued)

FOREIGN PATENT DOCUMENTS

EP 1338902 A1 8/2003

OTHER PUBLICATIONS

Klausing, H.; Bartsch, N.; Boesswetter, C., "A MM-Wave SAR-Design for Helicopter Application (ROSAR)," European Microwave Conference, 1986. 16th , vol., No., pp. 317-328, Oct. 1986.*

(Continued)

*Primary Examiner*—Thomas H Tarcza
*Assistant Examiner*—Cassi Galt
(74) *Attorney, Agent, or Firm*—Baker Botts L.L.P.

(57) ABSTRACT

Methods and systems for using ground penetrating radar (GPR) to obtain subsurface images. The depression angle, frequency, and polarization can all be adjusted for the soil conditions at hand. In particular, the depression angle is set at the "pseudo-Brewster angle" for improved ground penetration.

3 Claims, 4 Drawing Sheets

U.S. PATENT DOCUMENTS 7,259,715 B1 * 8/2007 Garren et al. ............... 342/179

OTHER PUBLICATIONS

Daniels, David J. Ground Penetrating Radar (2nd Edition). pp. 73-75. Institution of Engineering and Technology. <http://www.knovel.com/knovel2/Toc.jsp?BookID=1244&VeritcalID=0>.*

Ye, Wei, and Yeo, Tat Soon. "Radar Signal Processing." pp. 1-3. Wiley Encyclopedia of Electrical and Electronics Engineering. Copyright © 1999 by John Wiley & Sons, Inc. DOI: 10.1002/047134608X.W7214 Article Online Posting Date: Dec. 27, 1999.*

Pogue, 10 Greatest Gadget Ideas of the Year, The New York Times, http://www.nytimes.com/2005/12/29/technology/circuits/29pogue.html, 3 pages, Dec. 29, 2005.

International Search Report with Written Opinion, PCT/US06/11702, 8 pages, Sep. 24, 2007.

International Preliminary Report on Patentability with Written Opinion, PCT/US2006/011702, 6 pages, Oct. 18, 2007.

* cited by examiner

SIGNAL PROCESSING METHODS FOR GROUND PENETRATING RADAR FROM ELEVATED PLATFORMS

CROSS-REFERENCE TO RELATED APPLICATIONS

This application claims the benefit of U.S. Provisional Application No. 60/667,129 filed on Mar. 31, 2005, entitled "Signal Processing Methods for Ground Penetrating Radar from Elevated Platforms", which is incorporated herein by reference in its entirety.

TECHNICAL FIELD OF THE INVENTION

This invention relates to ground penetrating radar using elevated platforms, and more particularly to signal processing methods to enhance radar returns and radar imagery from subsurface objects.

BACKGROUND OF THE INVENTION

One of the biggest difficulties in performing ground-penetrating radar (GPR) from an elevated platform is the large surface reflection at the air-ground interface. When an electromagnetic wave impinges on the ground (the earth) from above, only part of the wave penetrates the earth and the remainder is reflected.

GPR performance depends both on the rate of attenuation of the signal in the ground and on the reflection coefficient at the surface. The reflection coefficient is dependent on a number of factors. These include the operating frequency, the wave polarization, the ground properties, and the wave angle. Once in the earth, the wave undergoes attenuation that is set by the ground dielectric and conductivity properties and the operating frequency.

Attenuation in the ground increases with the electrical conductivity of the soil or rock and is frequency dependent, with higher frequencies suffering higher attenuation rates. Electrical conductivity in turn increases with clay content and dissolved solids in the soil moisture or ground water.

Upon reflection from a subsurface object, the reflected wave is again attenuated by propagation and reflection at the earth-air interface on the way back to the radar antenna. These losses strongly affect the signal return because they happen twice: on entry and on exit.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to signal processing methods and systems to enhance radar returns and radar imagery from subsurface objects using ground penetrating radar (GPR) from elevated platforms. Applications of the method include detecting and locating buried objects, such as landmines, improvised explosive devices (IED's), unexploded ordnance, weapons caches, subsurface utilities, gravesites, and tunnels. Geological features, or any other subsurface features normally detectable by GPR, may also be detected and located.

The methods are applicable to both one-dimensional radar inspection, as well as to more advanced signal processing techniques such as Ground Penetrating Synthetic Aperture Radar (GP-SAR) imaging. The methods maximize signal returns and emphasize subsurface radar data, while minimizing or eliminating surface clutter.

Figure 1:
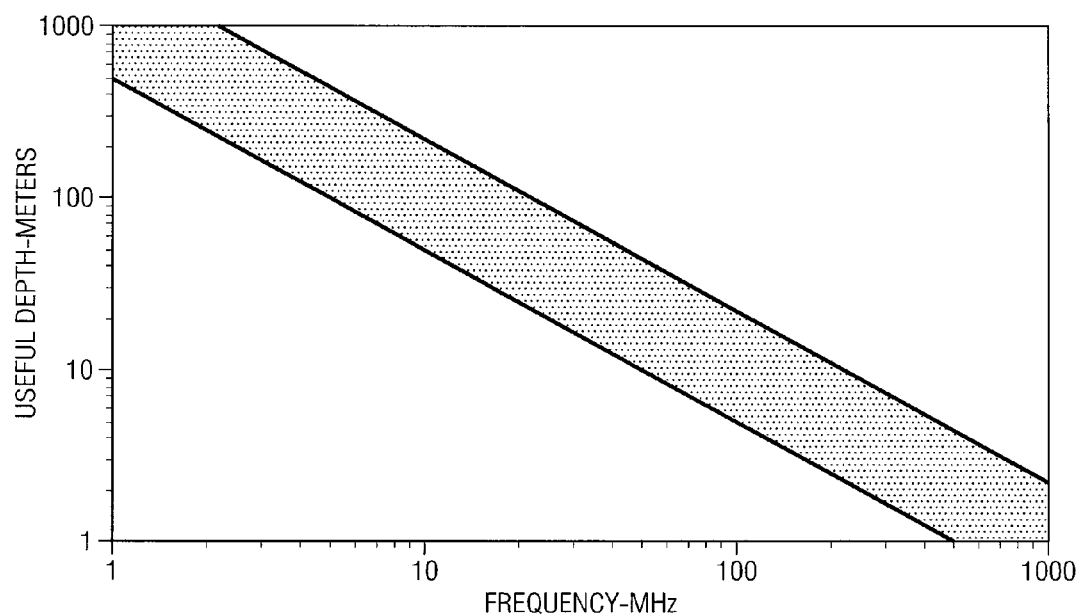
FIG. 1 illustrates the approximate relationship between useful ground penetration and frequency.

Exploitation of Pseudo-Brewster Angle FIG. 1 illustrates the approximate relationship between the depth of useful ground penetration and the frequency of the GPR signal. The useful GPR frequency range is approximately 1 MHz to 1 GHz. The signal strength scales inversely with increasing frequency. However, this rule-of-thumb can vary by a factor of 2 either way depending on ground conductivity. As indicated, the operating frequency of a GPR signal has a significant effect on ground penetration.

Figure 2:
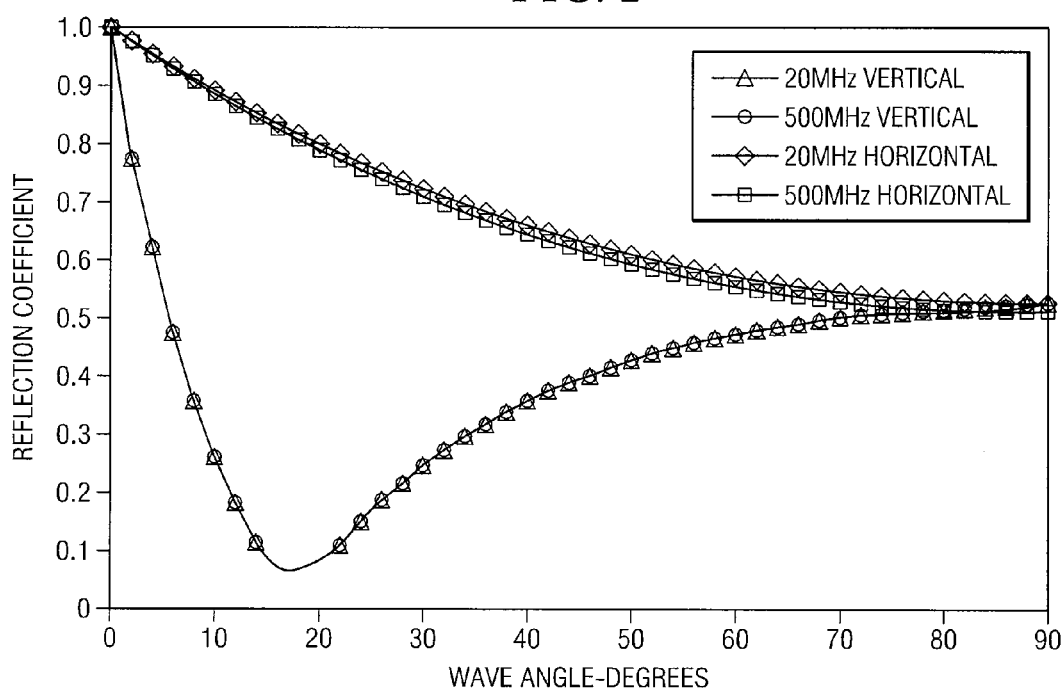
FIG. 2 is a graph depicting how the reflection coefficient varies over wave angle for vertical and horizontal polarization.

FIG. 2 is a graph depicting how the reflection coefficient varies with the GPR wave angle and polarization. Signals having four frequency/polarization characteristics are shown: 20 MHz vertical, 500 Mhz vertical, 20 MHz horizontal, and 500 MHz horizontal. In the example of FIG. 2, the ground comprises a substantially dry and sandy type material.

When GPR illuminates the ground from an elevated location, the electromagnetic wave incident on the surface is partly reflected and partly refracted, and the division is set by the reflection coefficient. As stated in the Background, the reflection coefficient is a function of the ground conductivity and dielectric constant, and the wave polarization and angle.

As illustrated, the reflection coefficient has a dip available to vertically polarized waves arriving at specific wave angles as governed by soil conditions. The wave angle giving the smallest reflection coefficient (and therefore greatest ground penetration) is known as the Pseudo-Brewster Angle (PBA). As explained below, two vertically polarized waves, both near the PBA, will exhibit a difference in ground penetration attributable to a difference in reflection coefficients.

Figure 3:
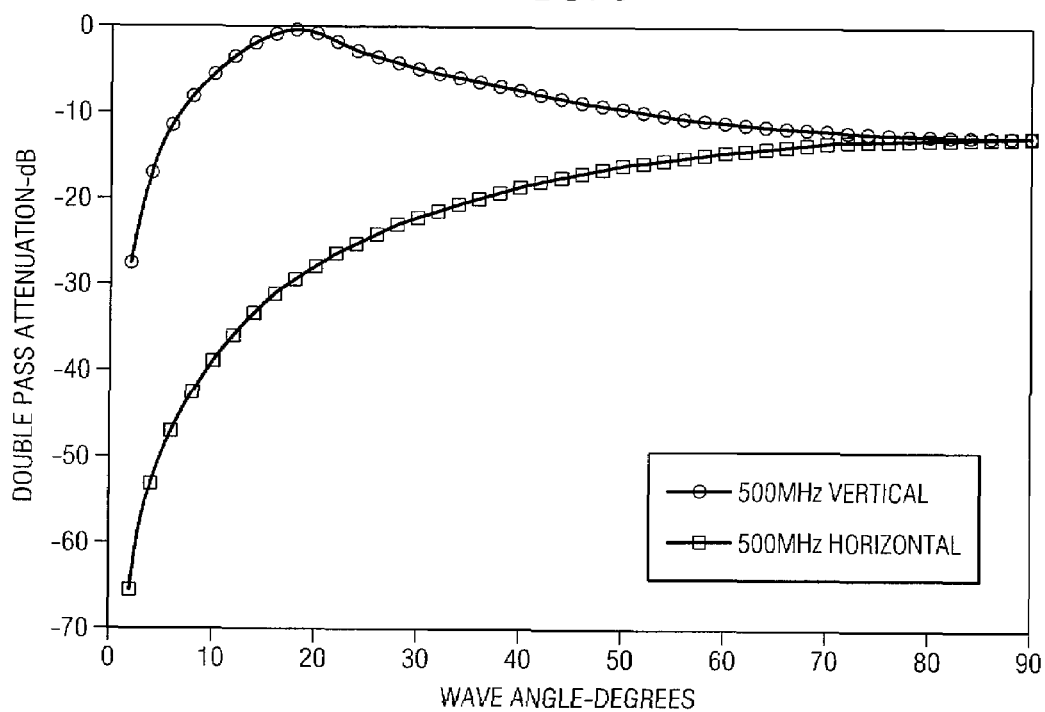
FIG. 3 illustrates how vertical polarization with incidence angles near the Pseudo-Brewster Angle (PBA) can result in as much as 30 dB signal improvement over horizontal polarization.

FIG. 3 illustrates the double pass loss of the GPR signal through the same ground material as FIG. 2 for two signals. Both signals are 500 MHz signals, but one is vertically polarized and one is horizontally polarized.

As illustrated in FIG. 3, vertical polarization with incidence angles near the PBA can result in as much as 30 dB signal improvement over horizontal polarization. However, at vertical incidence, the reflection coefficient is the same for both vertical and horizontal polarization.

Figure 4:
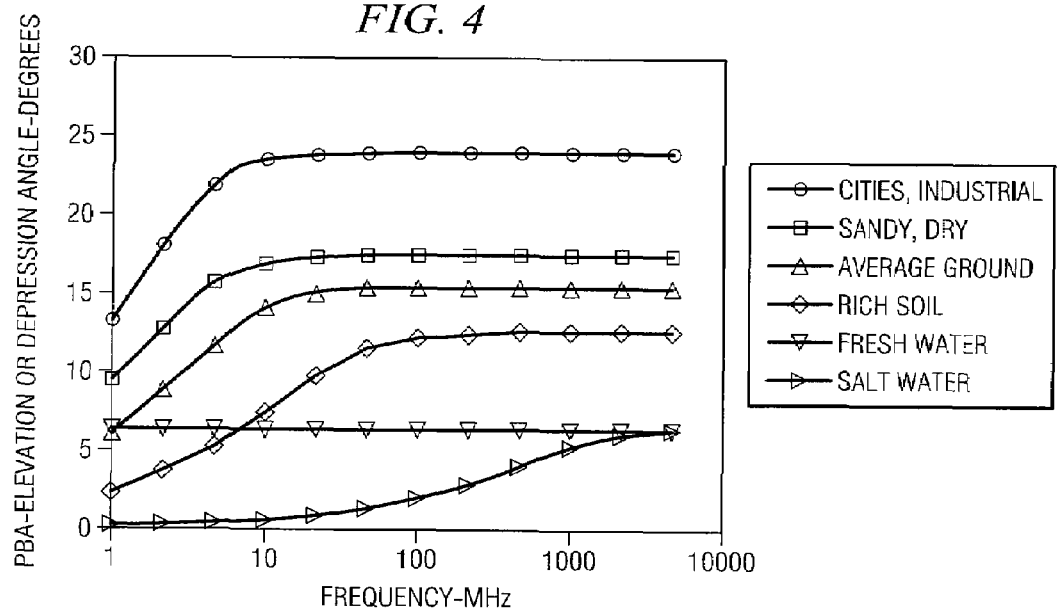
FIG. 4 illustrates how the PBA is dependent both on frequency and soil type.

FIG. 4 illustrates the variance of the PBA for vertical polarization for various types of earth. As illustrated, the PBA is dependent both on frequency and soil type. For a given terrain, the PBA is constant above a certain frequency.

Interferometric Enhancements for Subsurface Radar Returns
The preceding section describes different factors that affect GPR return signals from subsurface features. These differences can be used to enhance the quality of data from subsurface targets and reduce data attributable from surface clutter. In general, the methods described herein involve differencing the data from two return signals. The signals vary in one of the above described characteristics, such as operating frequency, polarization, or incident angle.

One method involves using GPR signals at different operating frequencies. Higher frequencies suffer greater attenuation rates in the ground than lower frequencies.

A second method involves using GPR signals at different polarizations. Depending on frequency, soil parameters, and wave angle, incident radio frequency energy of different polarizations can results in return signals having disparate ground penetration.

A third method involves using the difference in ground penetration attributed to the difference in reflection coefficient of two vertically polarized signals. One signal is incident near the PBA, and the other signal is incident at an angle that is sufficiently different to create a measurable difference in reflection coefficient.

Any or all of these techniques can be used to emphasize subsurface returns and to de-emphasize surface returns for a particular terrain.

Reflection Coefficient Interferometry

Use of an adjustable wave angle permits GPA operation to be optimized for a given set of soil and inspection conditions. If a wave angle is chosen near the PBA, reflection coefficient interferometry can be used to enhance radar echoes that are returned from beneath the surface.

The process requires simultaneous (or near simultaneous) inspection at both vertical and horizontal polarization. Then the data from the two polarization angles are differenced coherently at either the raw signal or processed image levels. Both polarizations respond similarly to surface detail and therefore cause surface signals to tend to cancel. However, because of the large difference in ground penetration caused by the difference in reflection coefficient, the differencing operation will result in incomplete cancellation for subsurface signals. Therefore, this processing technique can be used to help wash out surface clutter while improving contrast for subsurface features.

Two-Frequency Interferometry

The frequency dependent difference in attenuation rates in subsurface propagation also can be exploited to improve the contrast of subsurface detail while attenuating surface clutter. The process requires simultaneous (or near simultaneous) inspection at two different frequencies. The frequencies are chosen close enough together so that surface returns are comparable, but far enough apart so that the subsurface returns are of significantly different amplitudes. A differencing operation then will cause the surface detail to cancel while subsurface detail will be enhanced due to incomplete signal cancellation.

The differencing operation can be performed in two different ways: coherently and incoherently.

Incoherent differencing can be done at the signal level or between images formed from the two radar frequencies. At the signal level, the radar returns are first rectified and filtered to produce a video trace representing the envelope amplitude. At the image level, the individual radar returns are first processed to form RAR or SAR images. Then the data or images are differenced. Major features caused by surface returns in either format will tend to cancel, placing emphasis on the subsurface returns. This method of incoherent differencing does not take into account the phase differences of the returned signals but instead uses only envelope amplitude.

For coherent differencing, the two inspection channels must first be translated to the same frequency. Several methods for doing this exist, including:

a. Direct digital synthesis of all operating frequencies and local oscillator (LO) references from the same stable clock source. This will allow coherent generation of signals that can be used to create the high and low frequency channels along with the coherent LO references required to translate both channels to the same frequency for processing.

b. Generation of the radar pulse at a low intermediate frequency with subsequent translation to the operating frequencies via a high frequency LO. This will produce upper and lower sidebands that can have the desired frequency split. Subsequent frequency translation using the same LO source can translate both channels back to the same intermediate frequency for coherent processing.

c. Generation of the radar pulse at one of the two channels (high or low) and generation of the second through a frequency translation scheme using a LO that is the difference between the two channels. The data received on the second channel then is frequency translated back to the same frequency as the first using the same LO. Coherent processing then will be possible. Both sources must be stable over the course of the entire inspection.

In this context, the radar pulse can be any of the formats used to obtain high signal bandwidths. Examples of suitable frequency formats are short pulse, frequency chirp, or pseudo-random sequence.

Inspection Platforms

Suitable platforms for conducting radar inspections include satellites, manned and unmanned aircraft and helicopters, balloons, ground vehicles, and man-portable backpacks.

One platform that is particularly useful for subsurface detection and mapping of militarily important targets is the blade tips of rotorcraft. This platform can provide inspection zones that are annular swaths of radius either larger or smaller than the blade radius. This format is particularly advantageous for applications involving landmines, IED's, and weapons caches. Helicopters and rotorcraft UAV's offer additional flight advantages over fast fixed wing aircraft including the ability to fly very close to the ground, in cluttered environments, and to loiter in fixed locations. Mounting radar antennas on the rotor tips gives large and consistent velocities that can be used to exploit Doppler shifts as used in some processing methods.

Figure 5:
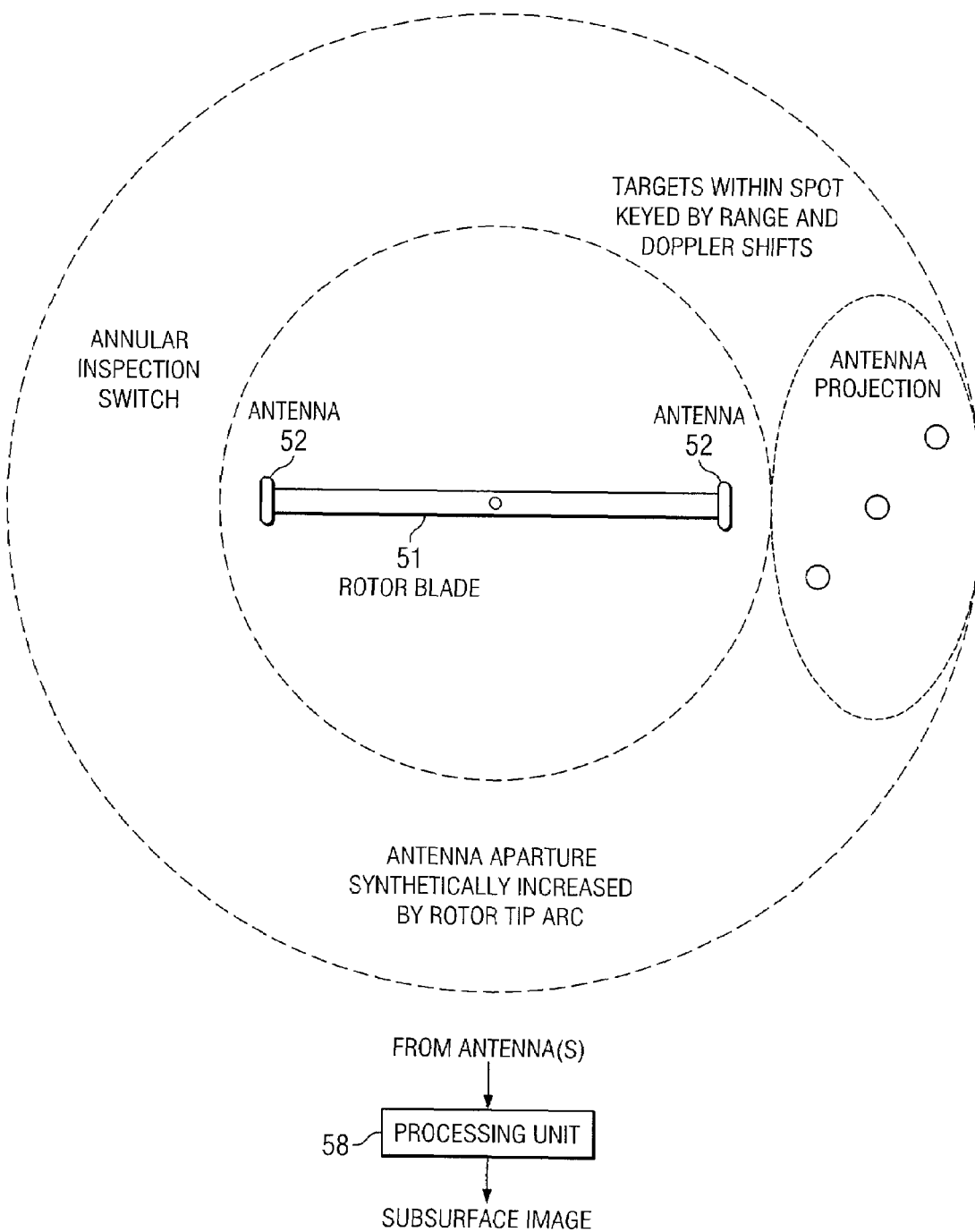
FIG. 5 illustrates one example of an inspection methodology.

FIG. 5 illustrates one example of an inspection methodology. Only the rotor blades 51 of the rotorcraft are shown. Radar antennas 52 are mounted on one or both of the tips of the rotor blades 51. The antenna 52 are pointed outwards and (in this example) downward to project an elliptical spot on the ground.

In a manner similar to aircraft SAR, targets within the spot are resolvable radially by range data and circumferentially by Doppler shift or correlation with an azimuth model. In this case the "Nadir Track" is circular and the inspection area is an annular swath on the ground. An annular SAR image of the surroundings radially outward or in upward or downward look angles could be generated from one stationary location.

As described above, the depression angle can be set to exploit improved ground penetration using vertical polarization at the pseudo-Brewster angle. If the helicopter is set in motion, an even larger aperture can be established and a larger area can be imaged in push-broom fashion as the rotorcraft raster scans over an area.

Figure 6:
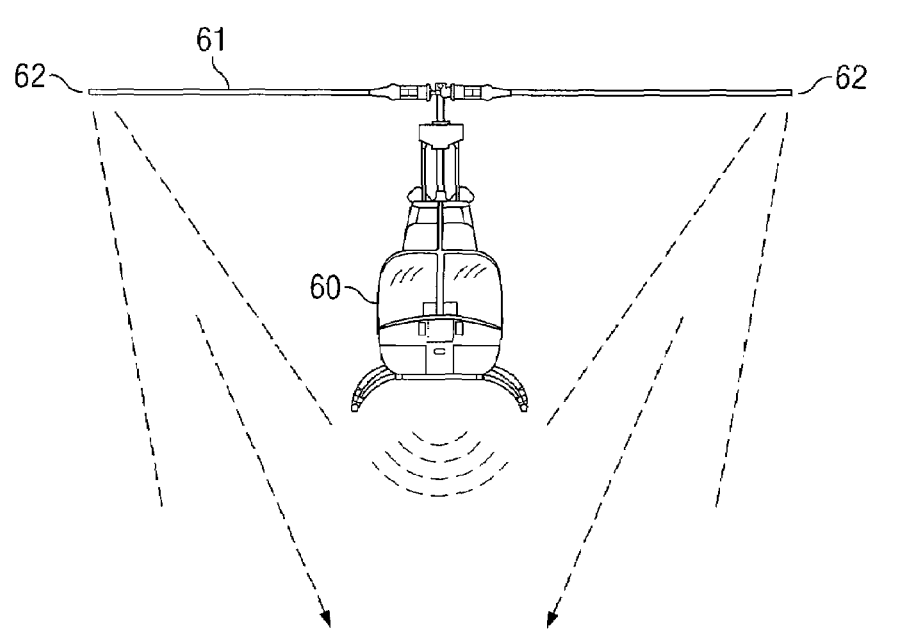
FIG. 6 illustrates another example of an inspection methodology.
Figure 6:
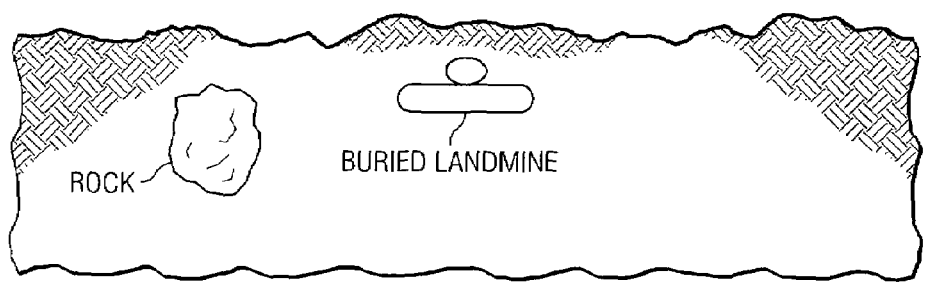
Figure 6:
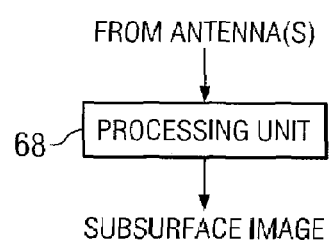

FIG. 6 illustrates another example of an inspection geometry. The rotorcraft 60 has rotor blades 61 with an antenna 62 mounted on each tip. As indicated below, this general configuration could be implemented with a single antenna.

The antenna view is directed inwards so that the spot projected on the ground is directly under the helicopter 60 (directly below the center of rotation). As the blades rotate, the antennas 62 see features on and below the ground with a 360-degrees perspective.

The angular aperture is set by the diameter of the blades 61 compared to height. It could be on the order of +/−30 to +/−45 degrees at low altitudes, giving an excellent viewing aperture, good resolution in elevation, and the possibility of exploiting the pseudo-Brewster angle to optimize penetration.

Either one antenna could be used to effect a one-sided inspection, or two could be used for pitch-catch operation. Pitch-catch operation is especially useful for targets with planar surfaces that are parallel to the rotor arc.

The configuration of FIG. 6 offers the advantage of a 360-degree perspective from a single location. It places the inspection area directly under the rotorcraft 60 so that other inspection methods can be used at the same time, enabling data fusion of multiple methodologies.

Referring again to FIG. 5, the above-described computations are performed by a processing unit 58. Processing unit 58 may be implemented with conventional processing and memory devices. A user interface may include a display for displaying subsurface images. Likewise, the configuration of FIG. 6 has a processing unit 68.

The proposed inspection methods take advantage of the rotating blade tips of a rotorcraft to provide real-time SAR imaging from a static rotorcraft location without the need for high speed fly-overs. The spinning antenna covers an area on the ground hundreds of times a minute. An image can be made from a static location without the need to move the helicopter. Signal averaging can be used to build up poor signal to noise ratios. An improvement in resolution results from the increased aperture afforded by the rotor blade arc and the convenience of Doppler processing results from the high-speed motion of the antennas.

What is claimed is:

1. A method of improving the data from ground penetrating radar (GPR) signals transmitted from an airborne platform into the ground and reflected from an object or feature in the ground, comprising:

selecting a frequency for the signal, based on characteristics of the ground and a desired depth of penetration of the signal into the ground;

wherein the frequency is in the range of 1 MHz to 1 GHz;

selecting a wave angle for the signal that minimizes the reflection coefficient for the signal at the interface between air and the ground;

at the selected frequency and selected wave angle: acquiring a first set of signal return data from a vertically polarized GPR signal, and simultaneously or nearly simultaneously acquiring a second set of signal return data from a horizontally polarized GPR signal;

differencing the first set of signal return data and the second set of signal return data, such that data resulting from surface reflections are cancelled from the differenced data; and analyzing the non-cancelled data to determine data representing subsurface reflections of the vertically polarized GPR signal and the horizontally polarized GPR signal, thereby obtaining data representing subsurface features.

2. The method of claim 1, wherein the processing is performed using a coherent differencing method.

3. The method of claim 1, wherein the inspection platform is a helicopter having antennas on the tips of both rotor blades and are configured to inspect the ground directly under the helicopter.

* * * * *